439/164

United States Patent [19]
Matsumoto et al.

[11] Patent Number: 5,882,216
[45] Date of Patent: Mar. 16, 1999

[54] ROTARY CONNECTOR

[75] Inventors: Mitsunori Matsumoto; Hiroyuki Bannai; Takehiko Ito, all of Miyagi-ken, Japan

[73] Assignee: Alps Electric Co., Ltd., Tokyo, Japan

[21] Appl. No.: 889,679

[22] Filed: Jul. 8, 1997

[30] Foreign Application Priority Data

Jul. 15, 1996 [JP] Japan ................................ 8-184996

[51] Int. Cl.⁶ .................................................... H01R 35/04
[52] U.S. Cl. .............................................. 439/164; 439/15
[58] Field of Search ........................................ 439/164, 15

[56] References Cited

U.S. PATENT DOCUMENTS 3,763,455 10/1973 Confer et al. ............................. 439/15
5,310,356 5/1994 Obata et al. ............................. 439/164
5,413,492 5/1995 Obata ....................................... 439/154

FOREIGN PATENT DOCUMENTS 0695 000 A2 1/1996 European Pat. Off. .

406338372 12/1994 Japan ..................................... 439/164

*Primary Examiner*—Gary F. Paumen
*Attorney, Agent, or Firm*—Brinks Hofer Gilson & Lione

[57] ABSTRACT

A rotary connector including a moving member (5) provided with first and second openings (14, 15) which is disposed in a holding space (10) formed between a fixed housing (1) having an upper case (6) and a movable housing (2) having a lower case (7) such that the moving member coaxially rotates with the movable housing (2) relative to the fixed housing (1). A width ($W_1$) of the first opening (14) is made smaller than a width ($W_2$) of the second opening (15) (i.e., $W_1 < W_2$). First and second flat cables (3, 4) are wound in the holding space (10) and have both ends thereof respectively fixed to the peripheral surfaces of the upper case (6) and the lower case (7), and reversal portions (3a, 4a) of the flat cables (3, 4) are passed through the first opening (14) and the second opening (15). The first flat cable (3) is directly wound on the cylindrical section (9) of the first flat cable (3), while the second flat cable (4) is wound on the first flat cable (3) so that the flat cables (3, 4) have different winding diameters relative to the inner cylindrical section (9).

16 Claims, 4 Drawing Sheets

ROTARY CONNECTOR

BACKGROUND OF THE INVENTION

1. Field of the Invention

The present invention relates to a rotary connector incorporated in an automotive steering unit and used, for example, as an electrical connection between an air bag device mounted on a steering wheel of an automobile and associated control circuitry mounted on a body of the automobile. More particularly, the present invention relates to a rotary connector in which flat cables are stored in a holding space formed between a fixed housing and a movable housing, wherein the flat cables are wound in opposing directions via U-shaped reversal portions.

2. Description of Related Art

A rotary connector includes a fixed housing, a movable housing which is rotatably connected to the fixed housing, and a flat cable stored in a holding space formed by the fixed housing and movable housing. The flat cable has a first end connected to a joint (connector) mounted on the fixed housing, and a second end connected to a joint mounted on the movable housing. Rotary connectors are incorporated in an automotive steering unit and employed, for example, to provide an electrical connection between an air bag inflator attached to a steering wheel of an automobile, which can be turned a finite number of revolutions, and associated control circuitry mounted on a body of the automobile. The flat cable is shaped like a band and supports a plurality of parallel conductors which extend between the first and second ends.

Two types of rotary connectors are commonly used: in the first type, the flat cable is wound in single direction (i.e., clockwise or counterclockwise) to form a coil, and in the second type, the flat cable is partially wound in a first direction, then reversed via a U-shaped reversal portion and partially wound in the opposite direction. In the second (reversal) type rotary connector, the required length of the flat cable is significantly reduced relative to that needed for the first (coiled) type rotary connector.

Reversal type rotary connectors typically use one flat cable with the plurality of conductors arranged in parallel. As the number of conductors is increased to meet a recent trend toward multiple-circuit applications, a problem arises in that the width of the flat cable must inevitably increase to support more conductors, thereby increasing the size of the rotary connector.

One solution to this problem is incorporated into the rotary connector disclosed in U.S. Pat. No. 3,763,455, which supports multiple-circuit applications by employing two flat cables to accommodate the conductors.

FIG. 4 is a top plan view illustrative of a schematic configuration of a rotary connector disclosed in U.S. Pat. No. 3,763,455. A movable housing 101, which has a cylindrical inner section, is rotatably connected to a fixed housing 100 having a cylindrical outer section. A first flat cable 103 and a second flat cable 104 are housed in an annular holding space 102 formed between the fixed housing 100 and the movable housing 101. These flat cables 103 and 104 are stored in the holding space 102 such that they are wound in a first (counterclockwise) direction around the outer cylindrical section of the fixed housing 100, and in a second (clockwise) direction around the inner cylindrical section of the movable housing 101. At the position where the winding direction is reversed, U-shaped reversal portions 103a and 104a are formed. The inner ends of the two flat cables 103 and 104 are connected to cable outlet sections 107 and 108 disposed adjacent to the inner cylindrical section of the movable housing 101. The outer ends of the two flat cables 103 and 104 are connected to cable outlet sections 109 and 110 located adjacent the outer cylindrical section of the fixed housing 100. Further, disposed in the holding space 102 are first and second groups of rollers 105 and 106 arranged in the circumferential direction, the reversal portion 103a of the first flat cable 103 being bent around the first group of rollers 105, and the reversal portion 104a of the second flat cable 104 being bent around the second group of rollers 106.

In the rotary connector thus configured, when, for example, the movable housing 101 is turned clockwise (relative to the fixed housing 100 in FIG. 4), the reversal portions 103a and 104a of the flat cables 103 and 104, respectively, move clockwise in the holding space 102 by an amount of which is smaller than that of the movable housing 101, causing the flat cables 103 and 104 to be wound onto the inner cylindrical section of the movable housing 101. Conversely, when the movable housing 101 is turned counterclockwise in FIG. 4, the reversal portions 103a and 104a of the flat cables 103 and 104, respectively, also move counterclockwise by an amount which is smaller than that of the movable housing 101, causing the flat cables 103 and 104 to be unwound from the outer cylindrical section of the fixed housing 100. At the time of such winding and unwinding, the groups of rollers 105 and 106 also move in the same direction in response to forces applied by the reversal portions 103a and 104a of the flat cables 103 and 104, respectively.

In the conventional rotary connector described above, the radial deformation of the two flat cables 103 and 104 is restricted by the groups of rollers 105 and 106. Hence, the flat cables 103 and 104 can be smoothly moved in the circumferential direction of the holding space 102. However, because the groups of rollers 105 and 106 are disposed in the holding space 102 so that they are separated from each other, vibrations applied to the rotary connector cause the groups of rollers 105 and 106 to bump against each other, producing a collision noise. Another problem associated with this rotary connector is that it is difficult to assemble the groups of rollers 105 and 106 onto the rotary connector.

One alternative arrangement addressing the problem described above is shown in FIG. 5. In this structure, instead of employing the mutually separated groups of rollers 105 and 106, a moving member 111 is movably disposed in the holding space 102 which has at least two openings 111a and 111b, and the reversal portions 103a and 104a of the flat cables 103 and 104 are passed through the openings 111a and 111b. The moving member 111 is composed of a ring-like rotary plate 112 and a plurality of rollers 113 rotatably connected to the rotary plate 112. The openings 111a and 111 are formed at equal intervals between the groups of the rollers 113. Hence, when the moving member 111 which has such openings 111a and 111b is employed, the rotary plate 112 and the rollers 113 can be mounted into the rotary connector during assembly as one piece, and bumping between the rollers is prevented, thus solving the problems mentioned above with respect to the conventional rotary connector. However, the rotary connector shown in FIG. 5 poses different problems which are described below.

Referring again to FIG. 5, the diameter of the inner cylindrical section of the movable housing 101 is denoted as D, and the thickness of each of the flat cables 103 and 104 is denoted as t. With this arrangement the winding diameter of the first flat cable 103 directly wound on the inner cylindrical section is D, whereas the winding diameter of the second flat cable 104 wound on the inner cylindrical section via the first flat cable 103 is (D+2t). Therefore, the winding diameters of the two flat cables 103 and 104 do not coincide. Accordingly, when the movable housing 101 is turned, the amount of winding of the flat cable 103 onto the inner cylindrical section is different from that of the flat cable 104, or the amount of unwinding of the two flat cables therefrom is different, thereby causing the reversal portion 104a of the second flat cable 104 which has the larger winding diameter to move faster than the reversal portion 103a of the first flat cable 103 which has the smaller winding diameter. As a result, as shown in FIG. 5, when the flat cables 103 and 104 are unwound from the inner cylindrical section and wound back onto the outer cylindrical section, the reversal portion 104a of the second flat cable 104 comes in contact with the roller 113 located at the end of the opening 111b, whereas the reversal portion 103a of the first flat cable 103, which is moving slower, merely moves in the opening 111a and does not come in contact with the roller 113, thus presenting a problem in that the moving member 111 cannot be smoothly moved by the forces applied by the two reversal portions 103a and 104a.

SUMMARY OF THE INVENTION

The present invention relates to a rotary connector including a moving member disposed in a holding space which is provided with a plurality of openings through which the reversal portions of a plurality of flat cables pass, wherein the width of one of the openings in the circumferential direction is set so that it is smaller than others. Thus, instead of setting all the openings of the moving member to the same width, the opening corresponding to the reversal portion of the flat cable which has a smaller winding diameter is set smaller than that of the opening corresponding to the reversal portion of a flat cable having a larger diameter so that the moving member smoothly moves in the holding space because the forces of the reversal portions of the flat cables are respectively applied to the moving member.

According to the present invention, a rotary connector includes a first housing which has an outer cylindrical section, a second housing which is rotatably attached to the first housing and which has an inner cylindrical section opposed to the outer cylindrical section such that an annular holding space is formed therebetween, a plurality of flat cables which are wound in the holding space such that reversal portions are formed and both ends thereof are respectively fixed to the outer cylindrical section and the inner cylindrical section, and a moving member which is disposed in the holding space such that it rotates relative to the fixed housing and which has a plurality of openings through which the reversal portions of the flat cables pass, wherein the width of one of the openings (measured in the circumferential direction) is smaller than the width of the other openings.

The moving member functions to prevent the flat cables from deforming in the radial direction within the holding space. The moving member may be constructed, for example, by a plurality of rollers rotatably connected to a rotary plate. In this structure, the openings are formed between adjacent pairs of rollers. Some of the rollers may be replaced by fixed cylinders such that each opening is formed between a fixed cylinder and an adjacent roller.

If there are N (N being an integer) flat cables, then it is necessary to provide the moving member with N openings. Forming the openings at approximately equal intervals in the circumferential direction of the moving member, i.e. locating the openings at approximately 360/N degrees, enables the forces by the reversal portions of the flat cables to be evenly applied to the moving member.

Providing the inner cylindrical section with a joint for bundling one end of each of the flat cables at a single location and leading one end of each of the flat cables out of the second housing through the joint makes it possible to simplify the structure of the connection with an external connector.

DESCRIPTION OF THE PREFERRED EMBODIMENTS

An embodiment of the present invention will be described with reference to FIGS. 1–3.

Figure 1:
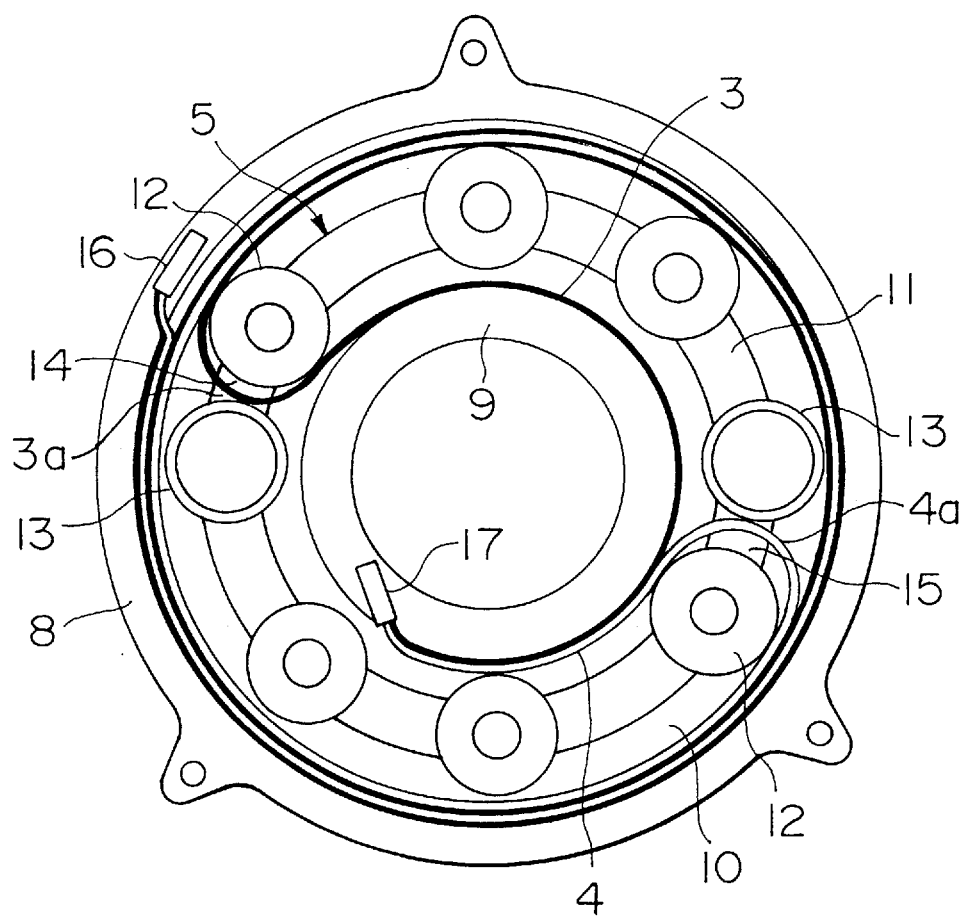
FIG. 1 is a top plan view of a rotary connector in accordance with an embodiment of the present invention.
Figure 2:
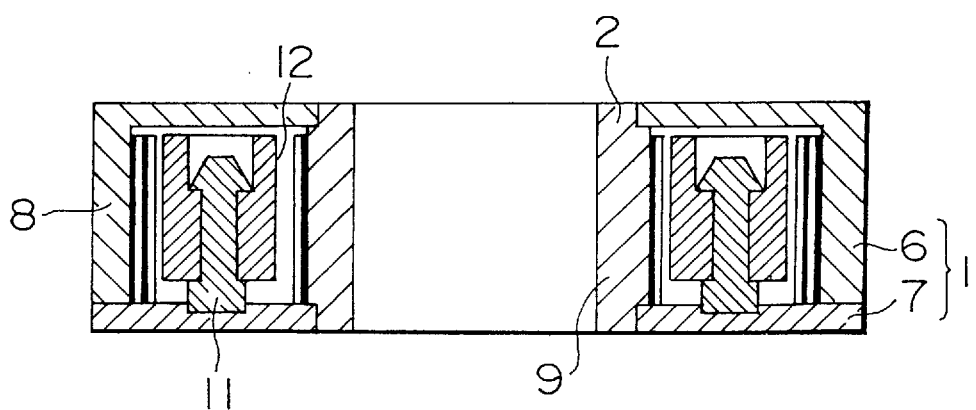
FIG. 2 is a sectional view of the rotary connector.
Figure 3:
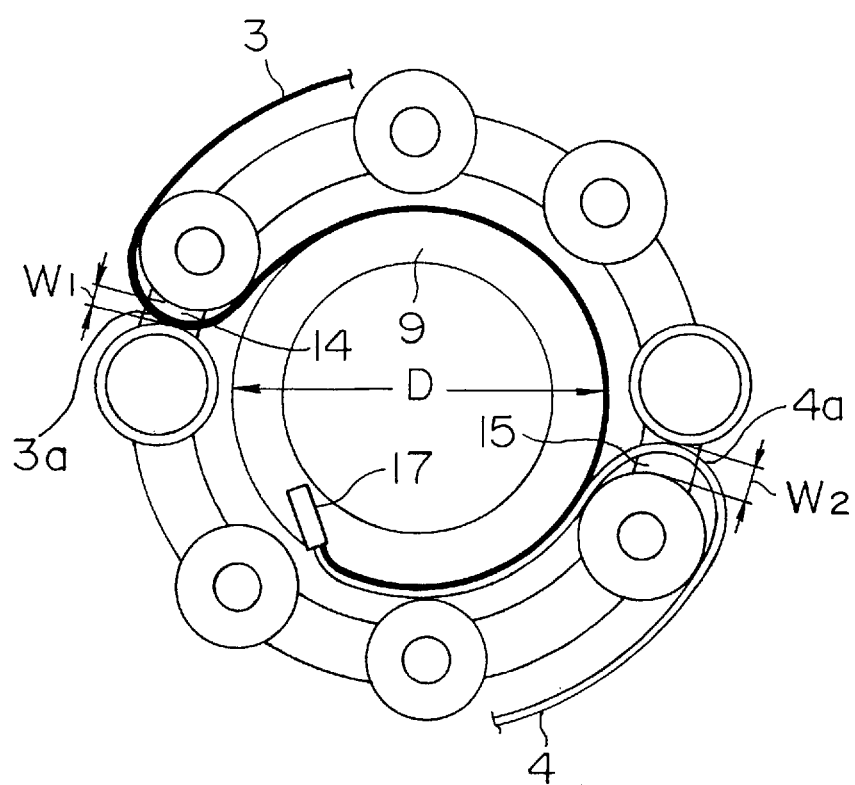
FIG. 3 is a schematic representation illustrative of an essential portion of the rotary connector.
Figure 4:
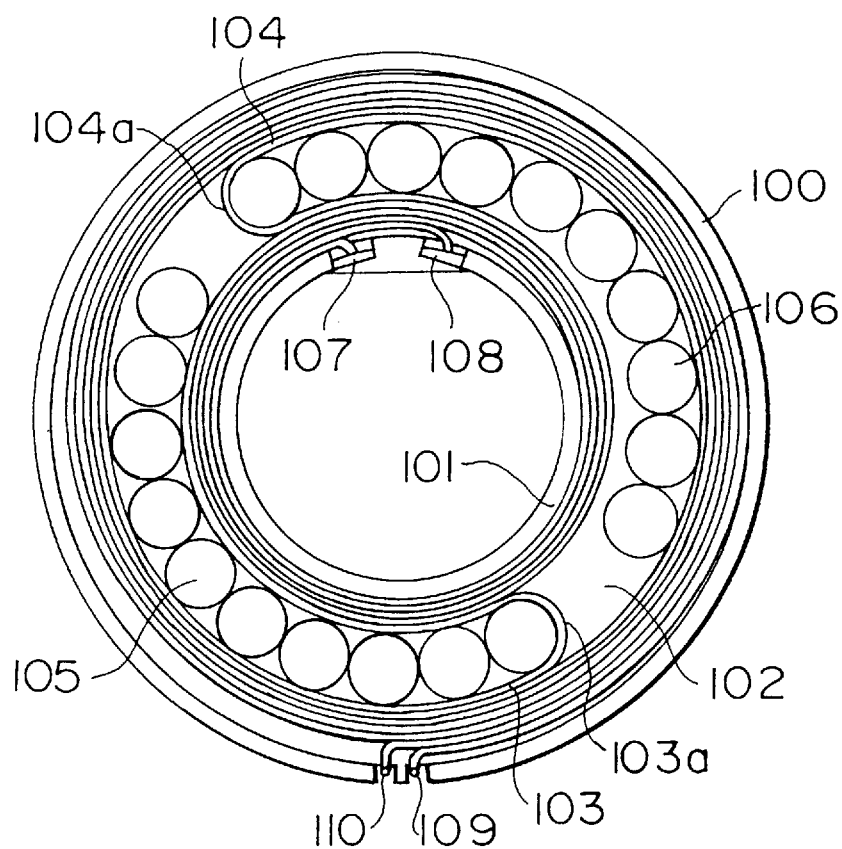
FIG. 4 is a top plan view of a first known rotary connector.
Figure 5:
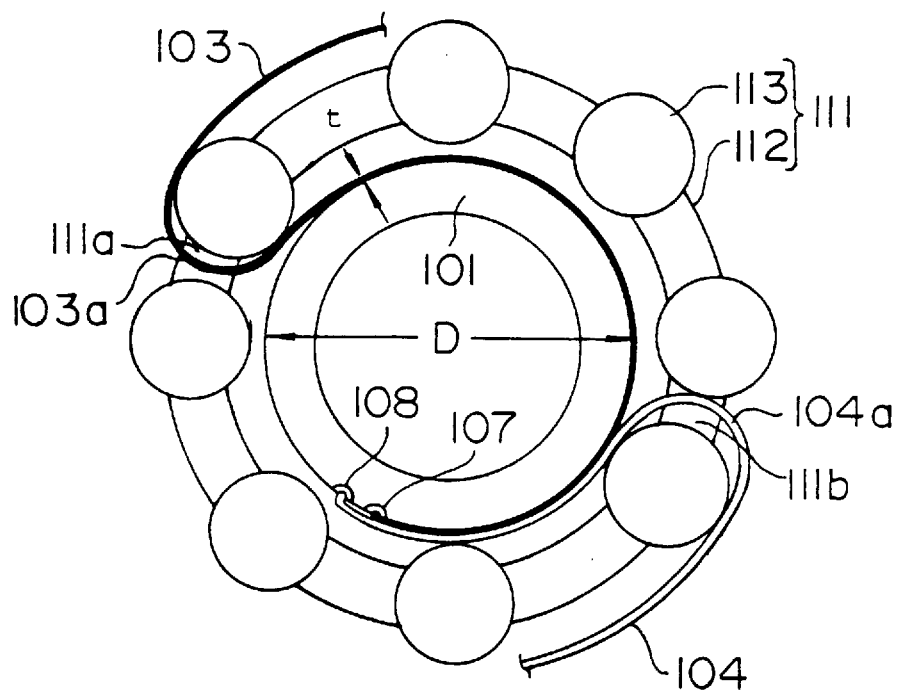
FIG. 5 a schematic representation of a second known rotary connector.

As shown in FIGS. 1–3, a rotary connector according to an embodiment of the present invention includes a fixed housing 1, a movable housing 2 rotatably connected to the fixed housing 1, first and second flat cables 3 and 4 connected between the two housings 1 and 2, and a moving member 5 which is disposed between the housings 1 and 2 such that it may rotate coaxially with the movable housing 2.

The fixed housing 1 includes an upper case 6 and a lower case 7 which are combined into one piece, and an outer cylindrical section 8 formed on the lower case 7. The movable housing 2 includes an inner cylindrical section 9. The outer cylindrical section 8 and the inner cylindrical section 9 are coaxially arranged, and an annular holding space 10 is formed between the two cylindrical sections 8 and 9. Disposed in the holding space 10 is the moving member 5 which includes an annular rotary plate 11, a plurality of rollers 12 rotatably connected to shafts extending from the rotary plate 11, and a pair of fixed cylinders 13. A first opening 14 is formed between one fixed cylinder 13 and one of the rollers 12, and a second opening 15 is formed between the other fixed cylinder 13 and another of the rollers 12, the openings 14 and 15 being located at about 180 degrees apart. As illustrated in FIG. 3, the width of the first opening 14 in the circumferential direction is denoted as $W_1$, and the width of the second opening 15 in the circumferential direction is denoted as $W_2$. In accordance with the present invention, these widths satisfy the relationship $W_1 < W_2$.

The first and second flat cables 3 and 4 are each shaped like a band composed of a plurality of parallel conductors made of, for example, copper formed on one surface of a base film made of, for example, an insulating tape formed from PET. For purposes of explanation, the first flat cable 3 is drawn in black, whereas the second flat cable 4 is drawn in white. The outer ends of the two flat cables 3 and 4 are connected to a fixed joint 16 secured to the outer cylindrical section 8 and electrically led out of the fixed housing 1 via the fixed joint 16. The inner ends of the two flat cables 3 and 4 are connected to a movable joint 17 fixed to the inner cylindrical section 9 and electrically led out of the movable housing 2 via the joint 17. Both flat cables 3 and 4 are housed in the holding space 10 such that they are wound counterclockwise along the inner wall of the outer cylindrical section 8 from the fixed joint 16 with the first flat cable 3 being on the inner side. The first and second flat cables 3 and 4 are then separated such that a U-shaped reversal portion 3a of the first flat cable 3 passes through the first opening 14, whereas a U-shaped reversal portion 4a of the second flat cable 4 passes through the second opening 15. The first and second flat cables are then wound clockwise on the peripheral surface of the inner cylindrical section 9 with the first flat cable 3 being on the outer side until the joint 17.

Hence, the inner end of the first flat cable 3 is directly wound around the inner cylindrical section 9, whereas the inner end of the second flat cable 4 is wound around the inner cylindrical section 9 via approximately one thickness of the first flat cable 3. More specifically, if the diameter of the inner cylindrical section 9 of the movable housing 2 is denoted as D and the thicknesses of the flat cables 3 and 4 are denoted as t, then the winding diameter of the first flat cable 3 is D, while the winding diameter of the second flat cable 4 is (D+2t). Therefore, the winding diameter of the second flat cable 4 wound around the inner cylindrical section 9 is larger than that of that of the first flat cable 3 wound around the inner cylindrical section 9. Widths $W_1$ and $W_2$ of the first and second openings 14 and 15, respectively, are determined with that difference in winding diameter taken into consideration; that is, width $W_1$ of the first opening 14 through which the reversal portion 3a of the first flat cable 3 having the smaller winding diameter passes is smaller than width $W_2$ of the second opening 15 through which the reversal portion 4a of the second flat cable 4 having the larger winding diameter passes.

The operation of the rotary connector according to the above-described embodiment of the present invention will now be described. In this embodiment, the fixed housing 1 is secured to a stator member of a steering unit, and an external connector, not shown, on an automobile body is connected to the fixed joint 16. The movable housing 2 is fixed to a steering wheel which forms the rotor member of the steering unit, and an external connector, not shown, on the steering wheel is connected to the movable joint 17.

In operation, when the steering wheel is turned clockwise or counterclockwise, the torque is transmitted to the movable housing 2, causing the movable housing 2 to rotate clockwise or counterclockwise. For instance, when the movable housing 2 rotates counterclockwise from the neutral position of the steering wheel, the reversal portions 3a and 4a of the first and second flat cables 3 and 4, respectively, accordingly move counterclockwise by an amount of rotation which is smaller than that of the movable housing 2, and the moving member 5 also moves counterclockwise in response to the movement of the reversal portions 3a and 4a. As a result, the flat cables 3 and 4 are unwound from the inner cylindrical section 9 and wound back onto the outer cylindrical section 8. In this case, the reversal portion 4a of the second flat cable 4 which has a larger winding diameter moves faster than the reversal portion 3a of the first flat cable 3 which has a smaller winding diameter; however, because of the relationship $W_1<W_2$, the two reversal portions 3a and 4a push the fixed cylinders 13 which are respectively located at one end of each of the openings 14 and 15, enabling the moving member 5 to smoothly move in the holding space 10 by being subjected to the forces applied by the two reversal portions 3a and 4a.

Conversely, when the movable housing 2 rotates clockwise from a state where the steering wheel is in the neutral position, the reversal portions 3a and 4a of the first and second flat cables 3 and 4, respectively, accordingly move clockwise by the amount of rotation which is smaller than that of the movable housing 2, and the moving member 5 also moves clockwise in response to the movement of the reversal portions 3a and 4a. As a result, the flat cables 3 and 4 are unwound from the outer cylindrical section 8 and wound on the inner cylindrical section 9. In this case, the reversal portion 4a of the second flat cable 4 which has a larger winding diameter moves faster than the reversal portion 3a of the first flat cable 3 which has a smaller winding diameter; however, because of the relationship $W_1<W_2$, the two reversal portions 3a and 4a pull the rollers 12 which are respectively located at the other ends of the openings 14 and 15, enabling he moving member 5 to smoothly move in the holding space 10 by being subjected to the forces applied by the two reversal portions 3a and 4a.

Thus, in the embodiment described above, widths $W_1$ and $W_2$ of the first and second openings 14 and 15 through which the reversal portions 3a and 4a of the flat cables 3 and 4 respectively pass are set to different values according to the difference in the winding diameters of the two flat cables 3 and 4 wound around the inner cylindrical section 9. Therefore, when the movable housing 2 rotates, the moving member 5 is rotationally driven primarily by the reversal portion 4a of the flat cable 4 having the larger winding diameter, however, the reversal portion 3a of the flat cable 3 is brought in contact with the end of the first opening 14, so that the forces from the reversal portions 3a and 4a of the flat cables 3 and 4, respectively, are applied to the moving member 5 so as to smoothly move the moving member especially because the first and second openings 14 and 15 are formed at 180 degree opposed positions on the moving member 5. In addition, the inner ends of the flat cables 3 and 4 are bundled at the same location by the movable joint 17, thus allowing the structure of the connection with the external connector on the steering wheel to be simplified.

Two flat cables 3 and 4 are employed in the above-described embodiment. However, the present invention can also be applied to a case where three or more flat cables are used. In the case in which three or more flat cables are used, the widths of a plurality of openings through which the reversal portions of the flat cables pass are properly set according to the differences among the winding diameters of the flat cables wound around the inner cylindrical section.

Thus, the present invention provides the following advantages.

By providing a moving member disposed in a holding space with a plurality of openings through which the reversal portions of a plurality of flat cables pass, and by setting the width of one of the openings in the circumferential direction so that it is smaller than others, even if the reversal portions of the flat cables move at different speeds due to the different winding diameters when winding or unwinding the flat cables, the forces from these reversal portions are respectively applied to the moving member so as to smoothly move the moving member.

Further, by forming the openings at about equal intervals in the circumferential direction of the moving member, the forces from the reversal portions of the flat cables are uniformly applied to the moving member.

Furthermore, the structure of the connection to an external connector can be simplified by providing the inner cylindrical section with a joint for bundling one end of each of the flat cables at the same location and by leading the ends of the flat cables out of the second housing.

What is claimed is:

1. A rotary connector comprising:

a first housing having an outer cylindrical section;

a second housing which is rotatably attached to said first housing and which has an inner cylindrical section opposed to said outer cylindrical section such that an annular holding space is formed therebetween;

a plurality of flat cables which are wound in said holding space, each of said plurality of flat cables having a first portion wound in a first direction, a second portion wound in a second direction, and a reversal portion connecting the first and second portions, where opposing ends of the plurality of flat cables are respectively fixed to said outer cylindrical section and said inner cylindrical section; and a moving member which is movably disposed in said holding space and which has a plurality of openings through which the reversal portions of said flat cables pass;

wherein the width of at least one of said openings in the circumferential direction is smaller than those of others.

2. A rotary connector according to claim 1, wherein said openings are provided at approximately equal intervals in the circumferential direction of said moving member.

3. A rotary connector according to claim 1, wherein said inner cylindrical section is provided with a joint for bundling one end of each of said flat cables at a single location.

4. A rotary connector according to claim 2, wherein said inner cylindrical section is provided with a joint for bundling one end of each of said flat cables at a single location.

5. A rotary connector according to claim 1, wherein said outer cylindrical section is provided with a joint for bundling one end of each of said flat cables at a single location.

6. A rotary connector according to claim 2, wherein said outer cylindrical section is provided with a joint for bundling one end of each of said flat cables at a single location.

7. A rotary connector according to claim 1, wherein at least one of said plurality of openings is formed by a roller rotatably mounted on the movable member and a fixed cylinder mounted on the movable member.

8. A rotary connector according to claim 2, wherein at least one of said plurality of openings is formed by a roller rotatably mounted on the movable member and a fixed cylinder mounted on the movable member.

9. A rotary connector comprising:

a first housing having an outer cylindrical section;

a second housing which is rotatably attached to said first housing and which has an inner cylindrical section opposed to said outer cylindrical section such that an annular holding space is formed therebetween;

two flat cables which are wound in said holding space, each of said two flat cables having a first portion wound in a first direction, a second portion wound in a second direction, and a reversal portion connecting the first and second portions, where opposing ends of the two flat cables are respectively fixed to said outer cylindrical section and said inner cylindrical section; and a moving member which is movably disposed in said holding space and which has two openings through which the respective reversal portions of said two flat cables pass;

wherein the width of one of said two openings in the circumferential direction is set so that it is smaller than that of the other.

10. A rotary connector according to claim 9, wherein said two openings are provided at positions 180 degrees apart on said moving member.

11. A rotary connector according to claim 9, wherein said inner cylindrical section is provided with a joint for bundling one end of each of said flat cables at a single location.

12. A rotary connector according to claim 10, wherein said inner cylindrical section is provided with a joint for bundling one end of each of said flat cables at a single location.

13. A rotary connector according to claim 9, wherein said outer cylindrical section is provided with a joint for bundling one end of each of said flat cables at a single location.

14. A rotary connector according to claim 10, wherein said outer cylindrical section is provided with a joint for bundling one end of each of said flat cables at a single location.

15. A rotary connector according to claim 9, wherein at least one of said two openings is formed by a roller rotatably mounted on the movable member and a fixed cylinder mounted on the movable member.

16. A rotary connector according to claim 10, wherein at least one of said two openings is formed by a roller rotatably mounted on the movable member and a fixed cylinder mounted on the movable member.

* * * * *